United States Patent
Kang

(10) Patent No.: US 7,128,063 B2
(45) Date of Patent: Oct. 31, 2006

(54) HCCI ENGINE COMBUSTION CONTROL

(75) Inventor: Jun-Mo Kang, Ann Arbor, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/175,962

(22) Filed: Jul. 6, 2005

(65) Prior Publication Data

US 2006/0016438 A1     Jan. 26, 2006

Related U.S. Application Data

(60) Provisional application No. 60/589,652, filed on Jul. 21, 2004.

(51) Int. Cl.
    F02M 25/07     (2006.01)
    F02B 47/08     (2006.01)
    G06G 19/00     (2006.01)

(52) U.S. Cl. .......................... 123/568.14; 123/568.21; 701/108

(58) Field of Classification Search ........... 123/568.14, 123/568.16, 568.21–568.27, 568.11; 701/103, 701/108, 114, 115; 60/278, 279, 605.2
See application file for complete search history.

(56) References Cited

U.S. PATENT DOCUMENTS

| | | | |
|---|---|---|---|
| 6,212,467 B1 * | 4/2001 | Guzella et al. | 701/103 |
| 6,311,679 B1 * | 11/2001 | Druzhinina et al. | 123/568.21 |
| 6,378,508 B1 * | 4/2002 | Braun et al. | 123/568.21 |
| 6,480,782 B1 * | 11/2002 | Brackney et al. | 701/108 |
| 6,595,191 B1 * | 7/2003 | Braun et al. | 123/568.21 |
| 6,805,095 B1 * | 10/2004 | Sun et al. | 123/568.21 |
| 6,901,897 B1 * | 6/2005 | Poola et al. | 123/90.6 |
| 2005/0050882 A1 * | 3/2005 | Poola et al. | 60/285 |
| 2005/0217649 A1 * | 10/2005 | Shimazaki et al. | 123/568.14 |

OTHER PUBLICATIONS

SAE Technical Paper 2002-01-0111 "Compression Ratio Influence on Maximum Load of a Natural Gas Fueled HCCI Engine", Olsson, Tunestal, Johansson, Fiveland, Agama, Willi, Assanis, SAE 2002 World Congress, Detroit, MI Mar. 4-7, 2002.
SAE Technical Paper 2003-01-0748, "Integrated Simulation and Engine Test of Closed Loop HCCI Control by Aid of Variable Valve Timings", Agrell, Angstrom, Eriksson, Wikander, Linderyd, 2003 SAE World Congress, Detroit, MI Mar. 3-6, 2003.
SAE Technical Paper 2003-01-0754, "CSI—Controlled Augo Ignition—the Best Solution for the Fuel Consumption—Versus Emission Trade-Off?" Fuerhapter, Piock, Fraidl, 2003 SAE World Congress, Detroit, MI, Mar. 3-6, 2003.

* cited by examiner

*Primary Examiner*—Willis R. Wolfe, Jr.
(74) *Attorney, Agent, or Firm*—Kathryn A. Marra

(57) ABSTRACT

An exemplary method of controlling a gasoline engine operating unthrottled with homogeneous charge compression ignition (HCCI) combustion includes operating the engine with predetermined values of external EGR and internal EGR settings, and burned gas fraction set points for intake and exhaust gases. Repeated adjustments are made to the external EGR and internal EGR settings to move the exhaust and intake gases burned gas fractions toward their state set points. Effects of disturbances in actual operating conditions are thereby minimized.

20 Claims, 1 Drawing Sheet

HCCI ENGINE COMBUSTION CONTROL

CROSS-REFERENCE TO RELATED APPLICATIONS

This application claims priority from U.S. Provisional Patent Application No. 60/589,652 filed Jul. 21, 2004.

TECHNICAL FIELD

This invention relates to homogeneous charge compression ignition (HCCI) spark ignition engines and, more particularly, to control of combustion in such engines

BACKGROUND OF THE INVENTION

In an HCCI engine, the phasing of auto-ignited combustion strongly depends on the cylinder charge temperature, composition, and the cylinder pressure at intake valve closing. Hence, the input to the engine, such as amount of fuel, fuel injection timing, spark timing, EGR valve opening, and intake and exhaust valve profiles, must be carefully coordinated to ensure that those key cylinder variables are within a range where the auto-ignited combustion can be robustly achieved. Among those inputs, the most effective input that has a significant impact on cylinder variables is the intake and exhaust valve profiles, and there are two prevailing valve strategies concerned with those profiles; exhaust recompression and exhaust re-breathing.

In the exhaust recompression strategy, the cylinder charge temperature is controlled by trapping hot exhaust gas from the previous engine cycle by closing the exhaust valve early during the exhaust stroke, while opening the intake valve with late timing symmetrical to the exhaust valve closing timing. In this valve strategy, the cylinder charge composition and temperature depend on how early the exhaust valve closes during the exhaust stroke. For example, if the exhaust valve closes earlier during the exhaust stroke, more hot exhaust gas from the previous engine cycle would be trapped in the cylinder, leaving less cylinder volume for the fresh air mass, thereby, increasing the cylinder temperature, while decreasing the cylinder oxygen level. In the exhaust recompression strategy, the exhaust valve closing timing (thereby, the intake valve opening timing) is typically quantified by valve overlap, which has a negative number. The Negative Valve Overlap (NVO) is defined as the duration in crank angle between exhaust valve closing and intake valve opening.

In the exhaust re-breathing strategy, the cylinder charge temperature is controlled by re-inducting the hot exhaust gas into the cylinder through re-opening of the exhaust valve during the intake stroke. In this valve strategy, the cylinder charge composition and temperature depend on the lift of the exhaust valve re-opening during the intake stroke. Similarly with the exhaust recompression strategy, if the exhaust valve re-opens higher during the intake stroke, more hot exhaust gas from the previous engine cycle would be re-inducted in the cylinder, leaving less cylinder volume for the fresh air mass which, as a result, would increase the cylinder temperature, while decreasing the cylinder oxygen level.

SUMMARY OF THE INVENTION

This invention provides a method whereby HCCI combustion phasing can be controlled using either an exhaust recompression strategy or an exhaust re-breathing strategy, combined with external EGR.

In accordance with one aspect of the present invention, an internal combustion engine is operated unthrottled with homogeneous charge compression ignition. The engine is operated with predetermined external EGR and internal EGR settings. Desired burned gas fraction set points for intake and exhaust gases are provided. Repetitive determinations of burned gas fraction values of the intake and exhaust gases are made and differences from the corresponding desired burned gas fraction set points are calculated. Repetitive adjustments are made to the external EGR and internal EGR settings to move the burned gas fraction values of the intake and exhaust gases toward their corresponding set points. Adjustments made to the internal EGR setting are made with respect to a negative valve overlap setting when the engine is operated in an exhaust recompression mode. Adjustments made to the internal EGR setting are made with respect to an exhaust valve lift reopening setting when the engine is operated in an exhaust rebreathing mode. The method may also include the provision of a desired cylinder combustion phasing set point. Repetitive determinations of current combustion phasing values are made and differences from the desired cylinder combustion phasing set point are calculated. And, repetitive adjustments are made to the desired burned gas fraction set point for intake gases to reduce differences between current combustion phasing values and the desired cylinder combustion phasing set point. Combustion phasing set points may be with respect to location of peak pressure in the cylinders or location of combustion of one half the fuel supplied for each cylinder cycle.

In accordance with another aspect of the present invention, a control for an internal combustion engine operating unthrottled with HCCI combustion includes an open loop control providing external EGR and internal EGR settings. Also included in the control is a closed loop control providing desired burned gas fraction set points for intake and exhaust gases and adjustments to external EGR and internal EGR settings based on differences between actual burned gas fractions of intake gases and exhaust gases and the desired burned gas fraction set points. Adjustments made to the internal EGR setting are made with respect to a negative valve overlap setting when the engine is operated in an exhaust recompression mode. Adjustments made to the internal EGR setting are made with respect to an exhaust valve lift reopening setting when the engine is operated in an exhaust rebreathing mode. The closed loop control may also provide a desired cylinder combustion phasing set point and adjustments to the desired burned gas fraction set point for intake gases based on differences between actual combustion phasing and the desired cylinder combustion phasing set point. Combustion phasing set points may be with respect to location of peak pressure in the cylinders or location of combustion of one half the fuel supplied for each cylinder cycle.

In accordance with another aspect of the present invention, an internal combustion engine is operated unthrottled with homogeneous charge compression ignition. The engine is operated with a predetermined external EGR setting and a desired burned gas fraction set point for intake gases is provided. Repetitive determinations of burned gas fraction values of the intake gases are made and differences from the corresponding desired burned gas fraction set point for intake gases are calculated. Repetitive adjustments are made to the external EGR setting to move the burned gas fraction values of the intake gases toward the desired burned gas fraction set point for intake gases.

In accordance with another aspect of the present invention, an internal combustion engine is operated unthrottled with homogeneous charge compression ignition. The engine is operated with a predetermined internal EGR setting and a desired burned gas fraction set point for exhaust gases is provided. Repetitive determinations of burned gas fraction values of the exhaust gases are made and differences from the corresponding desired burned gas fraction set point for exhaust gases are calculated. Repetitive adjustments are made to the internal EGR setting to move the burned gas fraction values of the exhaust gases toward the desired burned gas fraction set point for exhaust gases. Adjustments made to the internal EGR setting are made with respect to a negative valve overlap setting when the engine is operated in an exhaust recompression mode. Adjustments made to the internal EGR setting are made with respect to an exhaust valve lift reopening setting when the engine is operated in an exhaust rebreathing mode.

These and other features and advantages of the invention will be more fully understood from the following description of certain specific embodiments of the invention taken together with the accompanying drawing.

DESCRIPTION OF THE DRAWING

The single figure of the drawing is a diagrammatic representation of an HCCI engine with a control system for operation in accordance with the present invention.

Figure 1:
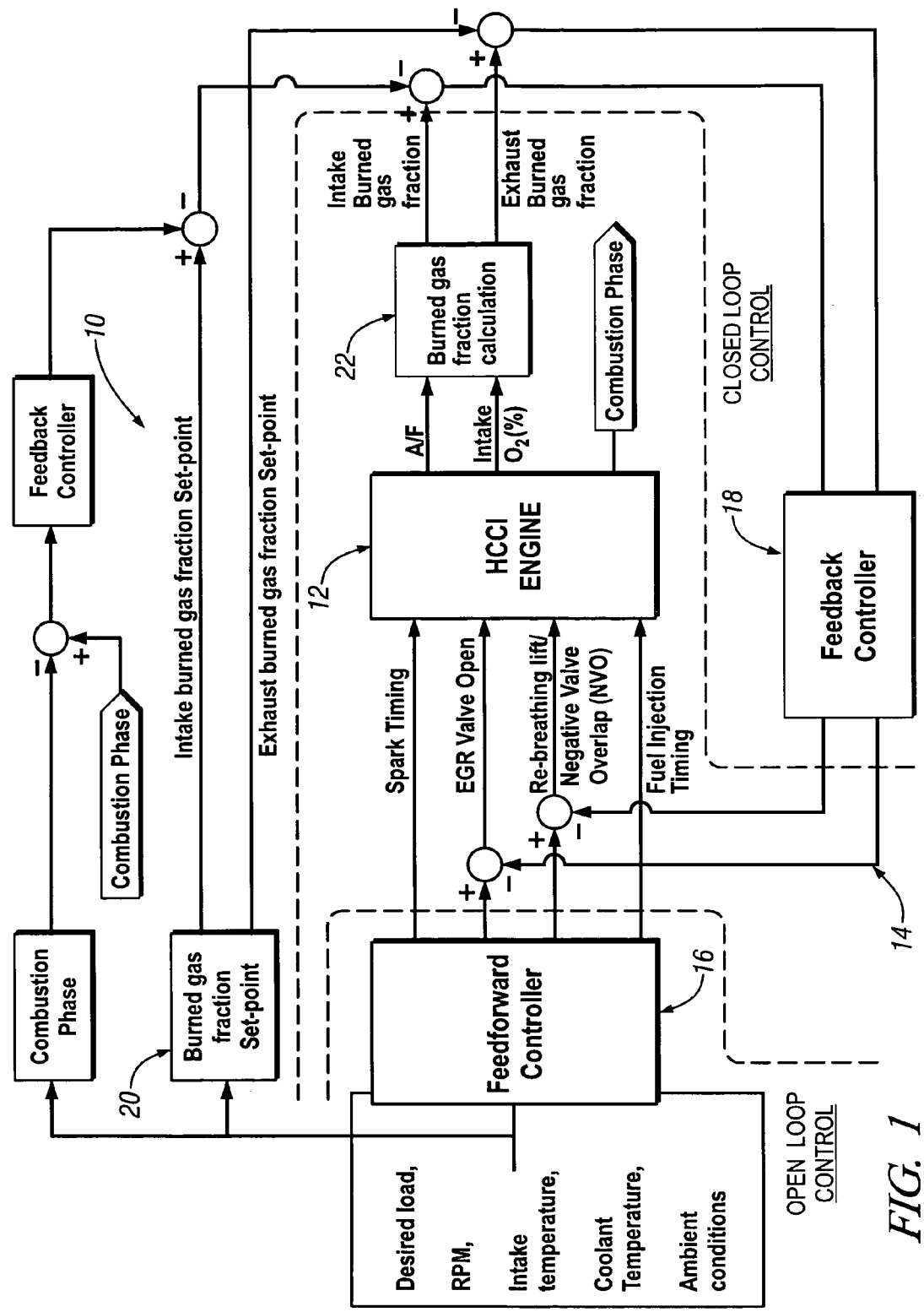

DESCRIPTION OF AN EXEMPLARY
EMBODIMENT

Referring now to the single figure of the drawing in detail, numeral 10 generally indicates a block diagram showing an engine 12 capable of operating with homogeneous charge compression ignition (HCCI) and a combustion control system 14 and method for controlling combustion in the engine.

The engine 12 may include various features or devices, not shown, including power producing combustion chambers (which may be in cylinders with reciprocating pistons) connected with an intake air system and an exhaust system, intake and exhaust valves with some form of variable valve timing operative to control fluid intake to and exhaust flow from the combustion chambers, an external exhaust recirculation system including an EGR valve connected between the intake and exhaust systems, and fuel injection and spark ignition systems for supplying fuel to and igniting or assisting ignition of combustible mixtures in the combustion chambers.

The engine 12 is designed to operate on fuel injected gasoline or similar blends, unthrottled with HCCI combustion over an extended range of engine speeds and loads, which may include engine starting where possible. However spark ignition and throttle controlled operation may be utilized with conventional or modified control methods under conditions not conducive to HCCI operation and to obtain maximum engine power. Applicable fueling strategies may including direct cylinder injection, port fuel injection or throttle body fuel injection. Widely available grades of gasoline and light ethanol blends thereof are preferred fuels; however, alternative liquid and gaseous fuels such as higher ethanol blends (e.g. E80, E85), neat ethanol (E99), neat methanol (M100), natural gas, hydrogen, biogas, various reformates, syngases etc. may also be used in the implementation of the present invention.

The described control system 14 and method pertains particularly to unthrottled operation of the engine with HCCI combustion, that may include a spark ignition backup. The combustion control system 14 includes one or more computers or controllers adapted to carry out a repetitive series of steps or functions in a method of combustion control according to the invention. The main controllers include a feedforward controller 16 and a feedback controller 18.

The feedforward controller 16 generates proper inputs to the engine, such as spark timing, injection timing, negative valve overlap (NVO in exhaust recompression strategy) or lift of exhaust valve reopening (in exhaust-re-breathing strategy). The exemplary feedforward controller 16 in the figure is adapted to receive input signals from an operator control (e.g. throttle pedal position), indicating the desired engine output, and from sensors indicating engine RPM, intake air temperature, coolant temperature and ambient conditions. Controller 16 functions to determine from lookup tables the instantaneous settings for spark timing, when needed, EGR valve set point, valve timing and/or lift set points and fuel injection timing and calculates the burned gas fractions in the intake and exhaust systems.

The feedforward controller is designed based on extensive calibrations to ensure a successful HCCI combustion under steady state operating conditions. However, with feedforward control only, the phasing of combustion can suffer from disturbances and/or environmental changes. Disturbances include, for example, significant or rapid changes in engine speed and load, which are necessary occurrences in vehicle engine operation.

Box 18 represents the feedback controller, which is the subject of the present invention and which achieves robust HCCI combustion under disturbances and/or environmental changes by adjusting the burned gas fractions in the intake and exhaust systems. Box 20 represents a look-up table that generates predetermined set-points (desired values in steady state) of burned gas fractions in the intake and exhaust systems, depending on engine load and speed, etc., for the feedback controller in box 18. At box 22, the burned gas fractions in the intake and exhaust manifolds are calculated from the measured/estimated exhaust air/fuel ratio (AF) and intake oxygen percentage.

The feedback controller 18 receives signals from the engine sensors, and/or estimates, indicating the air/fuel ratio (A/F) and the percent oxygen (percent $O_2$) in the intake gas or system and calculates the intake and exhaust burned gas fractions as indicated in box 22.

In the present invention, it is assumed that the HCCI engine 12 is operating with a lean air-fuel mixture under unthrottled conditions. Given the fact that the cylinder pressure at intake valve closing is almost equal to intake manifold pressure, and that intake manifold pressure is almost equal to ambient pressure under unthrottled operating conditions, the cylinder temperature and oxygen level in the cylinder (i.e., composition or percent oxygen) become the most important variables to be controlled.

Since the cylinder temperature and oxygen level are not conventionally measured, it is required to find alternative variables instead, which are measurable or can be estimated with reasonable accuracy for real-time control. Such alternative variables could be burned gas fractions in both intake and exhaust manifolds, which are defined as the mass percentages of burned air in intake and exhaust manifolds, respectively.

For example, once steady state temperatures and burned gas fractions in intake and exhaust manifolds are given, the steady state cylinder temperature and oxygen level are uniquely determined based on energy balance. Furthermore, since HCCI combustion (phasing) is asymptotically stable (under operating conditions where HCCI combustion can be robustly maintained), it can be seen that if burned gas fractions in the intake and exhaust manifolds are regulated at the steady state values by controlling the EGR valve opening and either intake and exhaust valve timing for negative valve overlap (NVO for exhaust recompression) or lift of exhaust valve re-opening (exhaust re-breathing), the cylinder temperature and oxygen level converge to the steady state values that were uniquely determined by the steady state burned gas fractions in intake and exhaust manifolds.

A fast controller that regulates burned gas fractions at set points can be designed based on the dynamic model of burned gas fractions and various control design techniques. The resulting controller is exemplified by the feedback controller 18 in the figure. If the burned gas fraction in intake manifold is not measured, it can be estimated based on the mass airflow and air-fuel ratio measurements. The desired burned gas fractions at the intake and exhaust manifolds are experimentally determined to achieve the desired combustion phasing in steady state and stored in a look-up table as shown in box 20 in the figure.

In operation, the feedback controller 18 compares the calculated burned gas fractions in the intake and exhaust manifolds with the desired set points found in the look up table 20. It then adjusts the readings of the EGR valve position and the valve lift (for exhaust rebreathing) or negative valve overlap (NVO) (for exhaust recompression) so that the valve positions are modified to approach the desired intake and exhaust burned gas fractions. Thus, robust combustion is assured during HCCI operation at steady state and in the presence of "disturbances" such as changes in speed and load as well as departures from ambient conditions during engine operation.

If desired, the method may be further modified to include adjustments for combustion phasing values, such as location of peak pressure (LPP) or location of combustion of one half the fuel supplied for each cylinder cycle. The operation could include: operating the engine with predetermined set point values for cylinder combustion phasing; repeatedly determining current combustion phasing values and calculating differences from the corresponding settings; repeatedly applying adjustments to the set point value for the intake manifold burned gas fractions to reduce differences of current combustion phasing from the corresponding settings; and repeatedly applying adjustments to the external EGR and internal EGR settings to move the the intake and exhaust manifold burned gas fractions toward their adjusted set points.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The invention claimed is:

1. Method of controlling an internal combustion engine operating unthrottled with HCCI combustion, the method comprising:
   operating the engine with a predetermined external EGR setting;
   providing a desired burned gas fraction set point for intake gases;
   repeatedly determining burned gas fraction values of the intake gases and calculating differences from the corresponding desired burned gas fraction set point for intake gases; and
   repeatedly applying adjustments to the external EGR setting to move the burned gas fraction values of the intake gases toward the desired burned gas fraction set point for intake gases.

2. The method as in claim 1 further comprising:
   operating the engine with a predetermined internal EGR setting;
   providing a desired burned gas fraction set point for exhaust gases;
   repeatedly determining burned gas fraction values of the exhaust gases and calculating differences from the desired burned gas fraction set point for exhaust gases; and
   repeatedly applying adjustments to the internal EGR setting to move the burned gas fraction values of the exhaust gases toward the desired burned gas fraction set point for exhaust gases.

3. Method of controlling an internal combustion engine operating unthrottled with HCCI combustion, the method comprising:
   operating the engine with a predetermined internal EGR setting;
   providing a desired burned gas fraction set point for exhaust gases;
   repeatedly determining burned gas fraction values of the exhaust gases and calculating differences from the desired burned gas fraction set point for exhaust gases; and
   repeatedly applying adjustments to the internal EGR setting to move the burned gas fraction values of the exhaust gases toward the desired burned gas fraction set point for exhaust gases.

4. The method as in claim 3 wherein the engine is operated in an exhaust recompression mode and said adjustments to the internal EGR setting are made to a negative valve overlap setting.

5. The method as in claim 3 wherein the engine is operated in an exhaust rebreathing mode and said adjustments to the internal EGR setting are made to an exhaust valve lift reopening setting.

6. Control for an internal combustion engine operating unthrottled with HCCI combustion, the method comprising:
   an open loop control providing external EGR and internal EGR settings; and
   a closed loop control providing desired burned gas fraction set points for intake and exhaust gases and adjustments to external EGR and internal EGR settings based on differences between actual burned gas fractions of intake gases and exhaust gases and the desired burned gas fraction set points.

7. The control as in claim 6 wherein the engine is operated in an exhaust recompression mode and said adjustments to the internal EGR setting are made to a negative valve overlap setting.

8. The control as in claim 6 wherein the engine is operated in an exhaust rebreathing mode and said adjustments to the internal EGR setting are made to an exhaust valve lift reopening setting.

9. The control as in claim 6 further comprising:
   said closed loop control providing a desired cylinder combustion phasing set point and adjustments to the desired burned gas fraction set point for intake gases based on differences between actual combustion phasing and the desired cylinder combustion phasing set point.

10. The control as in claim 9 wherein cylinder combustion phasing is with respect to location of peak pressure (LPP) in the cylinders.

11. The control as in claim 9 wherein cylinder combustion phasing is with respect to location of combustion of one half the fuel supplied for each cylinder cycle.

12. Method of controlling an internal combustion engine operating unthrottled with HCCI combustion, the method comprising:
   operating the engine with predetermined external EGR and internal EGR settings;
   providing desired burned gas fraction set points for intake and exhaust gases;
   repeatedly determining current burned gas fraction values of the intake and exhaust gases and calculating differences from the corresponding desired burned gas fraction set points; and
   repeatedly applying adjustments to the external EGR and internal EGR settings to move the burned gas fraction values of the intake and exhaust gases toward their corresponding set points.

13. The method as in claim 12 wherein current burned gas fraction values of the intake and exhaust gases are determined from selected engine operating values.

14. The method as in claim 12 wherein said adjustments to the external EGR setting are made in response to feedback based on the difference between the current burned gas fraction value of the intake gases and the desired burned gas fraction set point for intake gases.

15. The method as in claim 12 wherein said adjustments to the internal EGR setting are made in response to feedback based on the difference between the current burned gas fraction value of the exhaust gases and the desired burned gas fraction set point for exhaust gases.

16. The method as in claim 15 wherein the engine is operated in an exhaust recompression mode and said adjustments to the internal EGR setting are made to a negative valve overlap setting.

17. The method as in claim 15 wherein the engine is operated in an exhaust rebreathing mode and said adjustments to the internal EGR setting are made to an exhaust valve lift reopening setting.

18. The method as in claim 12 further comprising:
   providing a desired cylinder combustion phasing set point;
   repeatedly determining current combustion phasing values and calculating differences from the desired cylinder combustion phasing set point; and
   repeatedly applying adjustments to the desired burned gas fraction set point for intake gases to reduce differences between current combustion phasing values and the desired cylinder combustion phasing set point.

19. The method as in claim 18 wherein a determined combustion phasing value is location of peak pressure (LPP) in the cylinders.

20. The method as in claim 18 wherein a determined combustion phasing value is location of combustion of one half the fuel supplied for each cylinder cycle.

* * * * *